(12) United States Patent
Lintulampi

(10) Patent No.: US 6,377,804 B1
(45) Date of Patent: *Apr. 23, 2002

(54) MOBILE COMMUNICATION SYSTEMS

(75) Inventor: Raino Lintulampi, Kiviniemi (FI)

(73) Assignee: Nokia Mobile Phones Ltd., Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,906

(22) Filed: Jun. 11, 1998

(30) Foreign Application Priority Data

Jun. 24, 1997 (FI) .................................. 972722

(51) Int. Cl.⁷ .................................. H04Q 7/20
(52) U.S. Cl. .................. 455/435; 455/426; 455/552; 455/553; 455/432; 455/433
(58) Field of Search ................ 455/434, 435, 455/432, 458, 445, 450, 433, 553, 426, 552

(56) References Cited

U.S. PATENT DOCUMENTS

| | | | | |
|---|---|---|---|---|
| 5,410,732 A | * | 4/1995 | Ames et al. ................ | 455/422 |
| 5,563,393 A | * | 10/1996 | La Porta et al. ......... | 379/221.02 |
| 5,613,213 A | * | 3/1997 | Nadell et al. ............. | 455/414 |
| 5,724,648 A | * | 3/1998 | Shaughnessy et al. ..... | 455/56.1 |
| 5,839,075 A | * | 11/1998 | Haartsen et al. ........... | 455/450 |
| 5,901,352 A | * | 5/1999 | St-Pierre et al. ........... | 455/426 |
| 5,920,818 A | * | 7/1999 | Frogigh et al. ............ | 455/443 |
| 5,960,354 A | * | 9/1999 | Einola ....................... | 455/454 |
| 5,995,610 A | * | 11/1999 | Smidt et al. ................ | 379/207 |
| 5,995,842 A | * | 11/1999 | Jonsson ...................... | 455/462 |
| 6,002,931 A | * | 12/1999 | Yamaguchi et al. ........ | 455/433 |
| 5,960,365 A | * | 4/2000 | Leih et al. ................. | 455/552 |
| 6,047,177 A | * | 4/2000 | Wickman ................... | 455/422 |
| 6,081,708 A | * | 6/2000 | Vasnier ...................... | 455/426 |

FOREIGN PATENT DOCUMENTS

| | | | |
|---|---|---|---|
| GB | 2 289 191 A | | 11/1995 |
| WO | WO 96/28947 | | 9/1996 |
| WO | WO 96/34503 | * | 10/1996 |
| WO | WO 96/38992 | * | 12/1996 ............ H04Q/7/38 |

OTHER PUBLICATIONS

Finnish Office Action.*

* cited by examiner

Primary Examiner—Daniel S. Hunter
Assistant Examiner—Yemane Woldetatios
(74) Attorney, Agent, or Firm—Perman & Green, LLP

(57) ABSTRACT

A method of operating a mobile telephone within a geographical area having overlapping coverage from a first, GSM, network and a second, UMTS, network, where said GSM network is the home network (HPLMN) of the mobile communication device and said GSM and UMTS networks provide respective first and second sets of services in said geographical area. The method comprises registering the telephone with the GSM network when a service of said first set is requested and registering the device with the UMTS network when a service of said second set, but not of said first set, is requested. The method provides the mobile telephone with a roaming for service function.

14 Claims, 6 Drawing Sheets

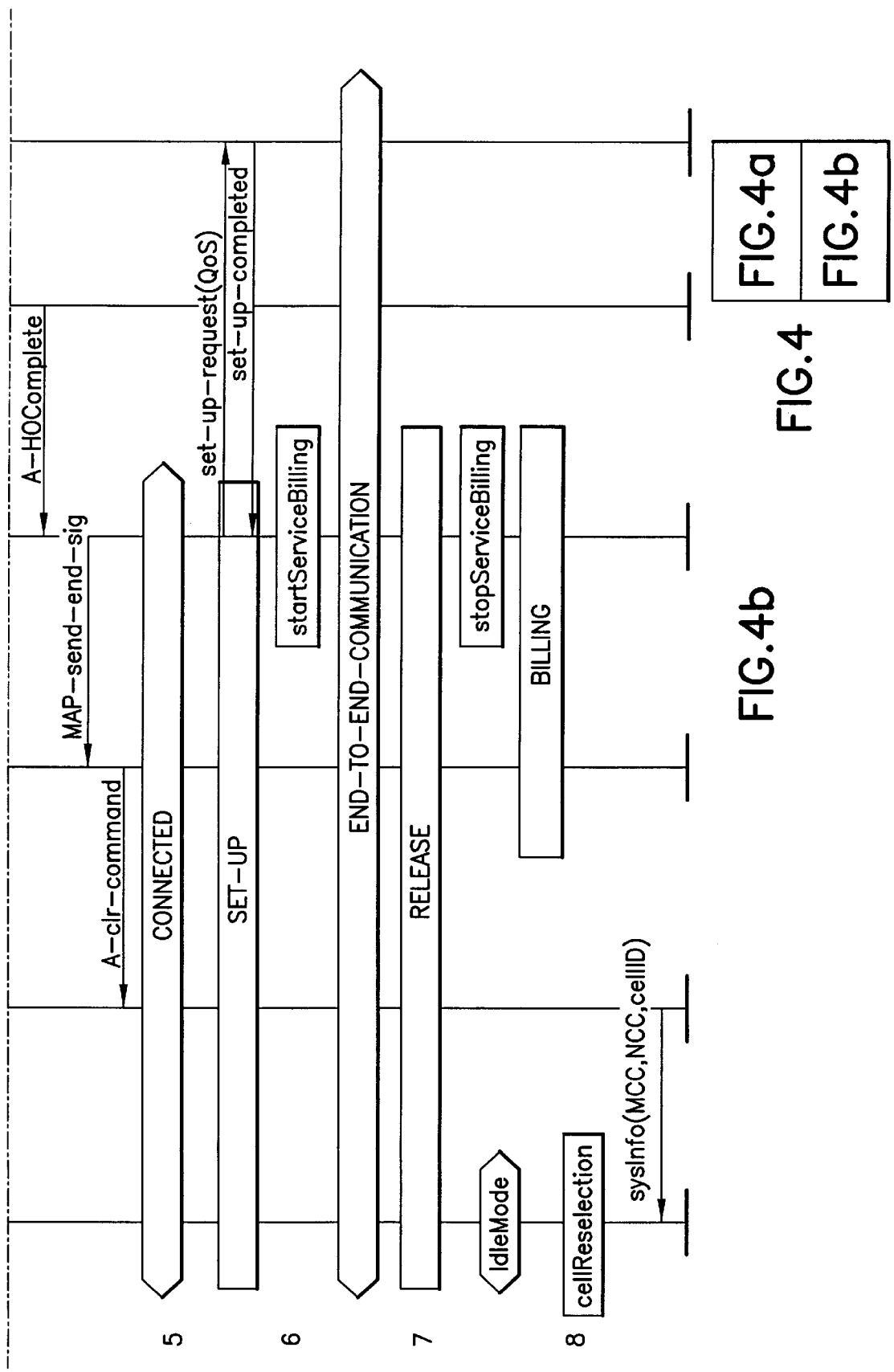

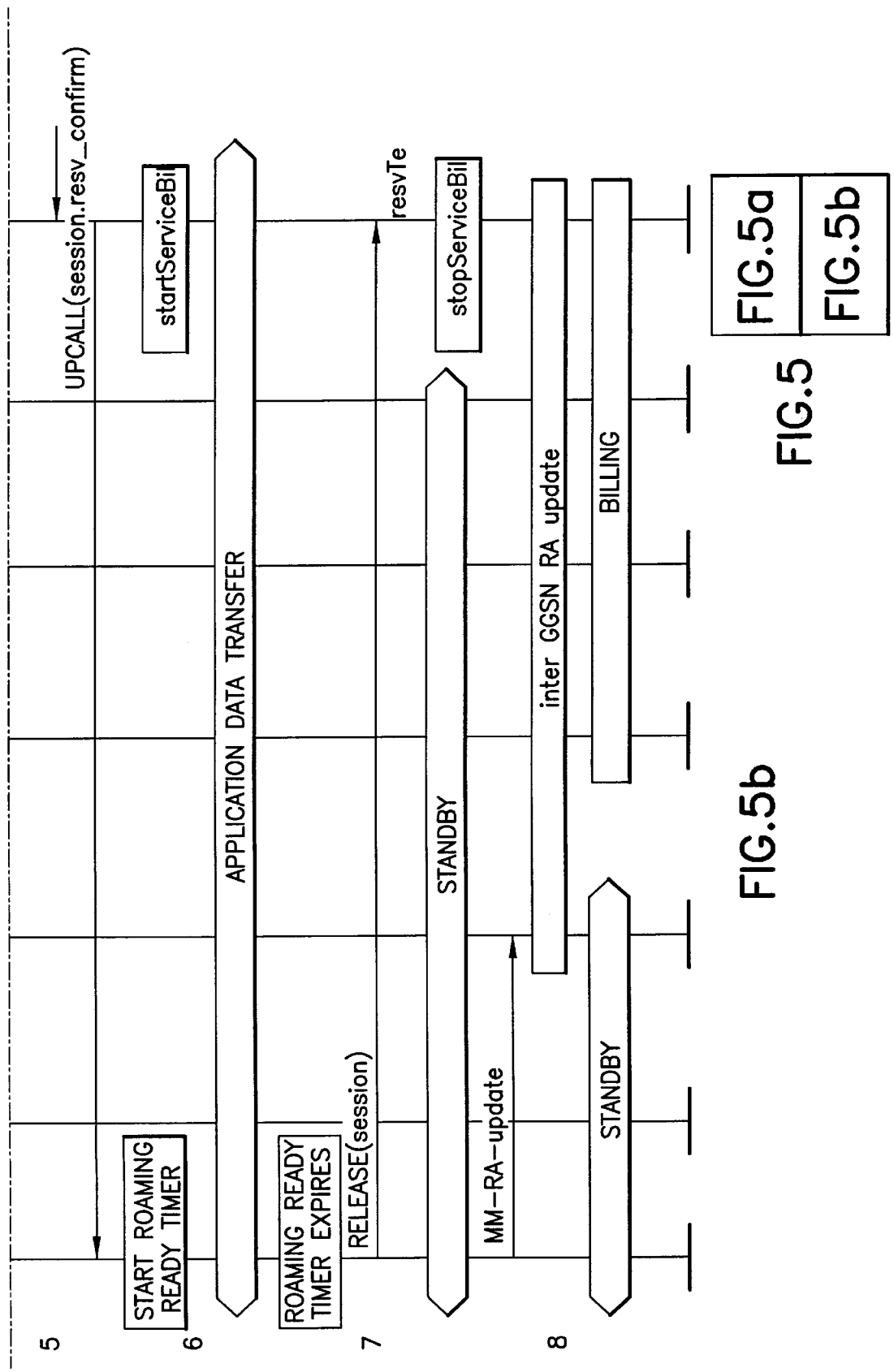

MOBILE COMMUNICATION SYSTEMS

FIELD OF THE INVENTION

The present invention relates to mobile communication systems and more particularly to a method of operating a mobile communication device within a geographical area having overlapping coverage from first and second mobile telephone networks, where said first network is the home network of the mobile communication device and said first and second networks provide respective first and second sets of services. The present invention also relates to a system for performing this method of operation.

BACKGROUND OF THE INVENTION

A number of digital mobile telephone standards are in use throughout the world. These include the European GSM standard and the US TDMA standard. However, due to the ever increasing demand for mobile telephone services many, if not all of these standards are likely to be superseded by new standards offering increased network capacity and/or increased data transmission rates. In particular, the European Telecommunications Standards Institute (ETSI) is currently developing a so called third generation mobile environment known as the Universal Mobile Telecommunication System (UMTS) which it is expected will be operational by 2002. UMTS will operate in the 2 GHz frequency band and will offer data transmission rates of up to 2 Mbits/sec, compared to a rate of only 9.6 Kbits/sec offered by the existing GSM standard.

In the transition from second generation standards to third generation standards, there is likely to be a period when both second and third generation standards will have to coexist. It is also possible that such coexisting networks will be operated by different operators. As with all previous standards, networks implementing the new standards are likely to be introduced piece-meal, extending their geographical coverage over time. It may also be the case that the geographical coverage offered by third generation networks will always be less than that offered by second generation networks due to the need to sustain high bit rate transmissions with the former.

It is proposed (in Europe at least) to enable mobile stations registered with a third generation network as the "home" network (i.e. the network to which the mobile stations subscribe) to transfer to a second generation network when the stations are outside the coverage area of the home network, with appropriate cross-billing agreements between the network operators, to alleviate the possible geographical limitations. This transfer will operate in substantially the same way as the "roaming" function of conventional GSM networks (GSM 03.22) where a station can register with an alternative network when the RF connection between the mobile station and the home network is too weak to support a traffic channel. Of course third generation terminals will have to be dual mode, e.g. UMTS/GSM, in order to take advantage of this facility.

The inventors of the present invention have addressed the problem of how mobile stations registered with earlier generation networks, e.g. second generation networks, as their home network may gain access to new services only available through new generation networks, e.g. third generation networks. This may be a requirement of reciprocal arrangements between second and third generation network operators. As far as the inventors are aware this problem has not been previously addressed.

SUMMARY OF THE INVENTION

According to the present invention there is provided a method of operating a mobile communication device within a geographical area having overlapping coverage from first and second mobile telephone networks, where said first network is the home network of the mobile communication device and said first and second networks provide respective first and second sets of services in said geographical area, the method comprising registering the device with said first network when a service of said first set is requested and registering the device with said second network when a service of said second set, but not of said first set, is requested.

Typically, although not essentially, the overall geographical coverage of said second network is less than that of said first network, as is likely to be the case in the period following the introduction of a new mobile telephone standard which is implemented by said second network.

Preferably, a service provided by said second network, but not by said first network, is a high transmission rate service, that is at a higher transmission rate than is possible with services provided by said first network. Examples of high bit rate services are internet browsing, videophone, and data downloading.

The request for a service may be made by the mobile communication device, e.g. in response to a user input, or by the first network, e.g. in response to an incoming call made to the mobile communication device. In either case, in the event that a service of said second set, but not of said first set, is requested, registration with said second network may be carried out automatically under the control of said first network. In this event, there is no need for the user of the mobile communication device to be aware of the change of registration. Alternatively, a decision on a change of registration may be made by a user via a user interface of the mobile communication device.

In one embodiment of the present invention, said first network is a GSM network and said second network is a UMTS network and said mobile communication device is a dual mode UMTS/GSM device.

According to a second aspect of the present invention there is provided a mobile telecommunication system comprising at least first and second mobile telephone networks having an overlapping geographical area of coverage and a multiplicity of mobile communication devices, wherein said first network is the home network of the mobile communication devices and said first and second networks are arranged to provide respective first and second sets of telephonic services in said geographical area, the system comprising control means for registering a communication device with said first network when a service of said first set is requested and for registering the device with said second network when a service of said second set, but not of said first set, is requested.

The control means may comprise means associated with each of the mobile communication devices for transmitting a deregistration request to the first network and for transmitting a registration request to the second network when a service of said second set, but not of said first set, is requested. Alternatively, the control means may comprise means associated with the first network for responding to a request from a communication device for a service of said second set, but not of said first set, by re-registering the communication device with the second network.

The mobile communication devices may be, for example, mobile telephones, combined mobile telephone/personal digital assistant devices, or other devices which use wireless telephonic communication.

BRIEF DESCRIPTION OF THE INVENTION

For a better understanding of the present invention and in order to show how the same may be carried into effect reference will now be made, by way of example, to the accompanying drawings, in which:

FIGS. 4A and 4B show at the signaling level an implementation of the method of FIG. 3 for circuit switched transmission; and FIGS. 5A and 5B show at the signaling level an implementation of the method of FIG. 3 for packet switched transmission.

DETAILED DESCRIPTION

Figure 1:
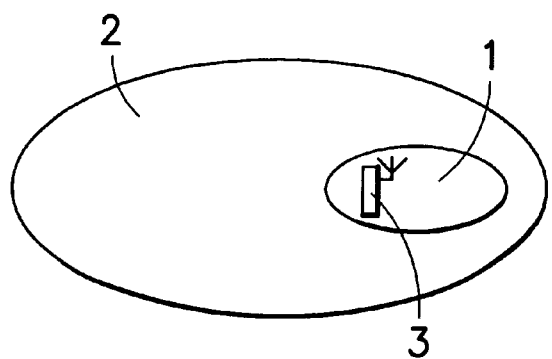
FIG. 1 shows schematically the geographically coverage area of example second and third generation mobile telephone networks.

As already noted above, in Europe, UMTS networks are likely to be introduced with only limited geographical coverage. This situation is illustrated in FIG. 1 where the coverage 1 provided by the UMTS network falls within the coverage area 2 of a pre-existing GSM network. When a UMTS compatible mobile station (MS) 3, which has the UMTS network as its home network (or home public land mobile network HPLMN), is located within the UMTS network coverage area 1, the MS 3 is registered with the UMTS network and is able to make use of all the services provided by that network (or at least those services to which the MS user has subscribed). Providing that the MS is also GSM compatible, and that an appropriate agreement exists between the operators of the UMTS and GSM networks, when the MS detects that it has moved outside of the UMTS network coverage area 1 it is able to register with the GSM network (as a visiting public land mobile network VPLMN) and to make use of the services provided by the GSM network. The services provided by the GSM network are likely to be more limited than those provided by the UMTS network but this disadvantage is more than offset by the increased coverage area available to the UMTS network subscriber. This arrangement is similar in principle to the 'roaming for coverage' function available with current GSM MSs, e.g. which operates when a MS moves from one country to another, as defined in GSM specification 03.22.

Figure 2:
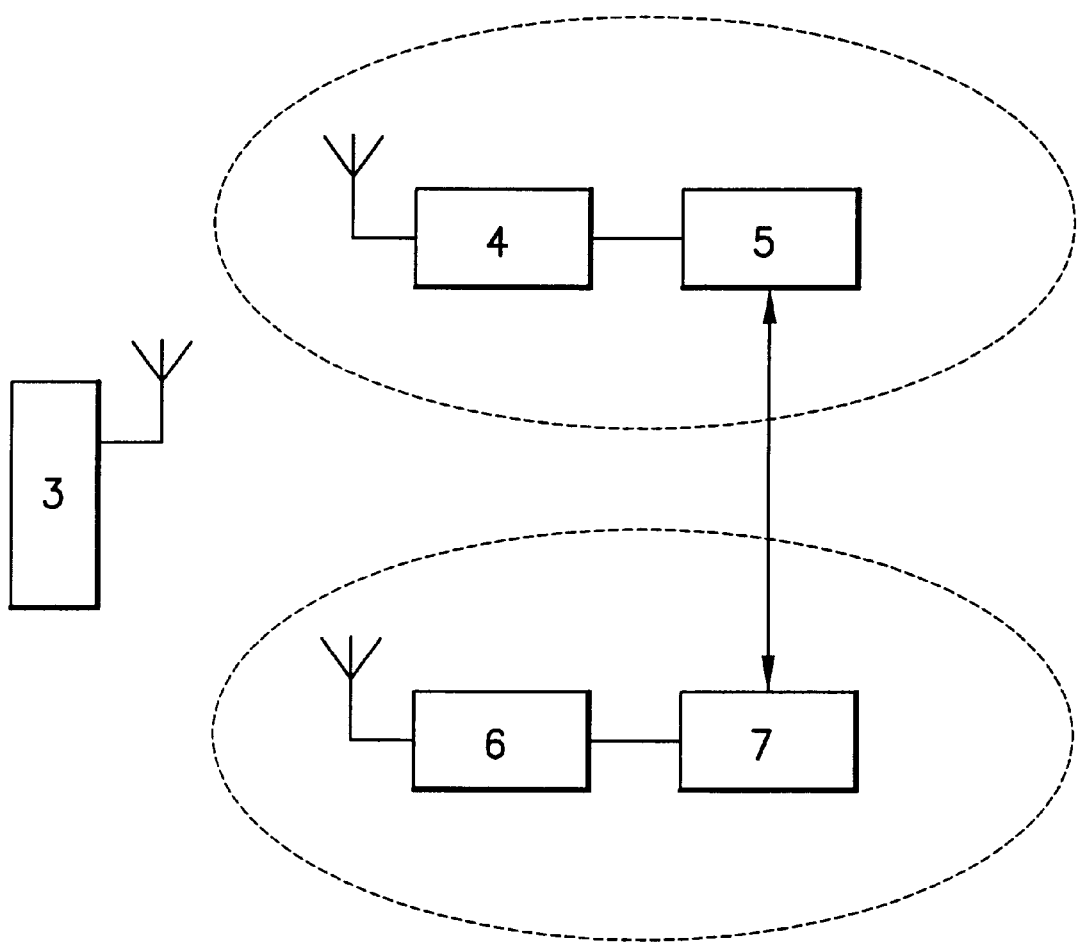
FIG. 2 shows in block diagram form the architectures of the second and third generation networks of FIG. 1.

The architectures of the GSM and UMTS networks are shown schematically in FIG. 2 where the dual-mode GSMI-UMTS MS 3 communicates with either the UMTS BSS (base station subsystem) 4 and the GSM/GPRS (global packet radio service) core network 5 or with the GSM/DCS BSS 6 and the GSM/GPRS core network 7. The two core networks 5,7 cooperate according to a roaming agreement between the two network operators.

Figure 3:
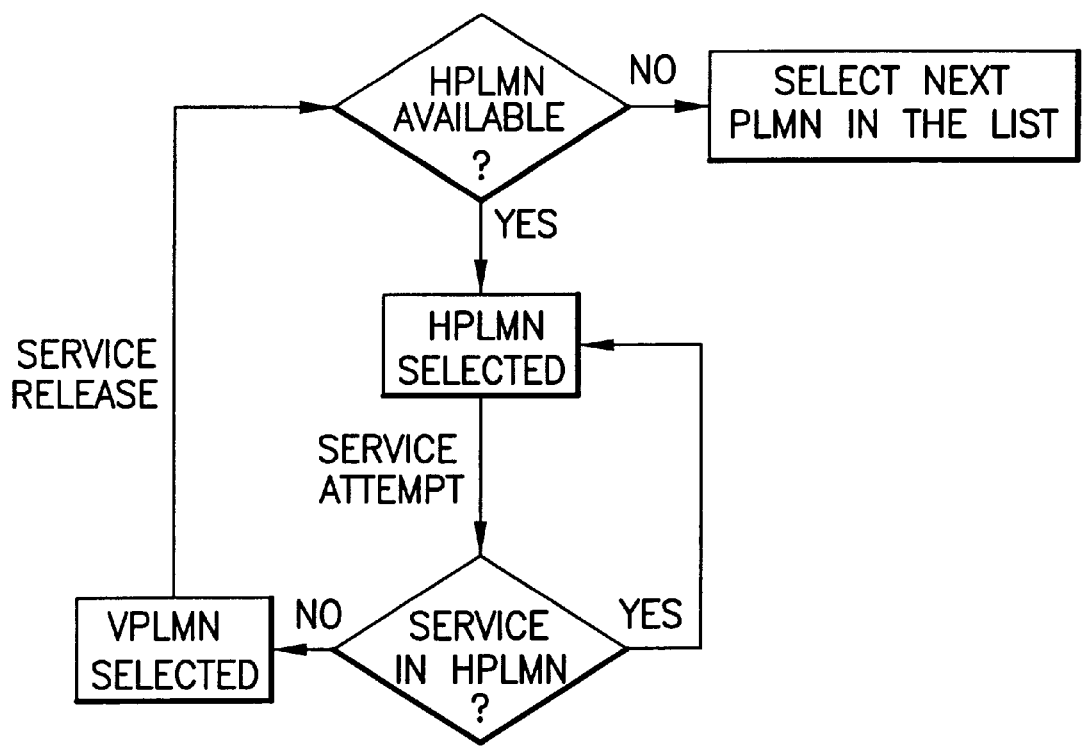
FIG. 3 shows a flow diagram of the operation of a mobile station in the coverage area of the networks of FIG. 1.

Consider now the case where the MS 3 is registered with the GSM network as its HPLMN. The MS 3 may make use of the GSM services throughout the GSM coverage area 2, including the UMTS coverage area 1 because of the overlapping coverage which exists there. However, if the MS 3 requires to use of a service provided by a UMTS network (i.e. as a VPLMN) but not by the GSM network, the MS 3 must 'roam' for that service. This is different from the conventional 'roaming for coverage' offered by GSM and is not defined in GSM specification 03.22. FIG. 3 is a flow diagram of the roaming for service operation illustrating that the HPLMN will be selected by the MS 3 so long as that network is available and the selected service is provided by the HPLMN.

Roaming for service differs from traditional roaming for coverage in that, with the former, location updates and thus location registration are not necessarily required because the MS 3 can remain registered with the home GSM network which knows the location of the MS 3.

Figure 4A:
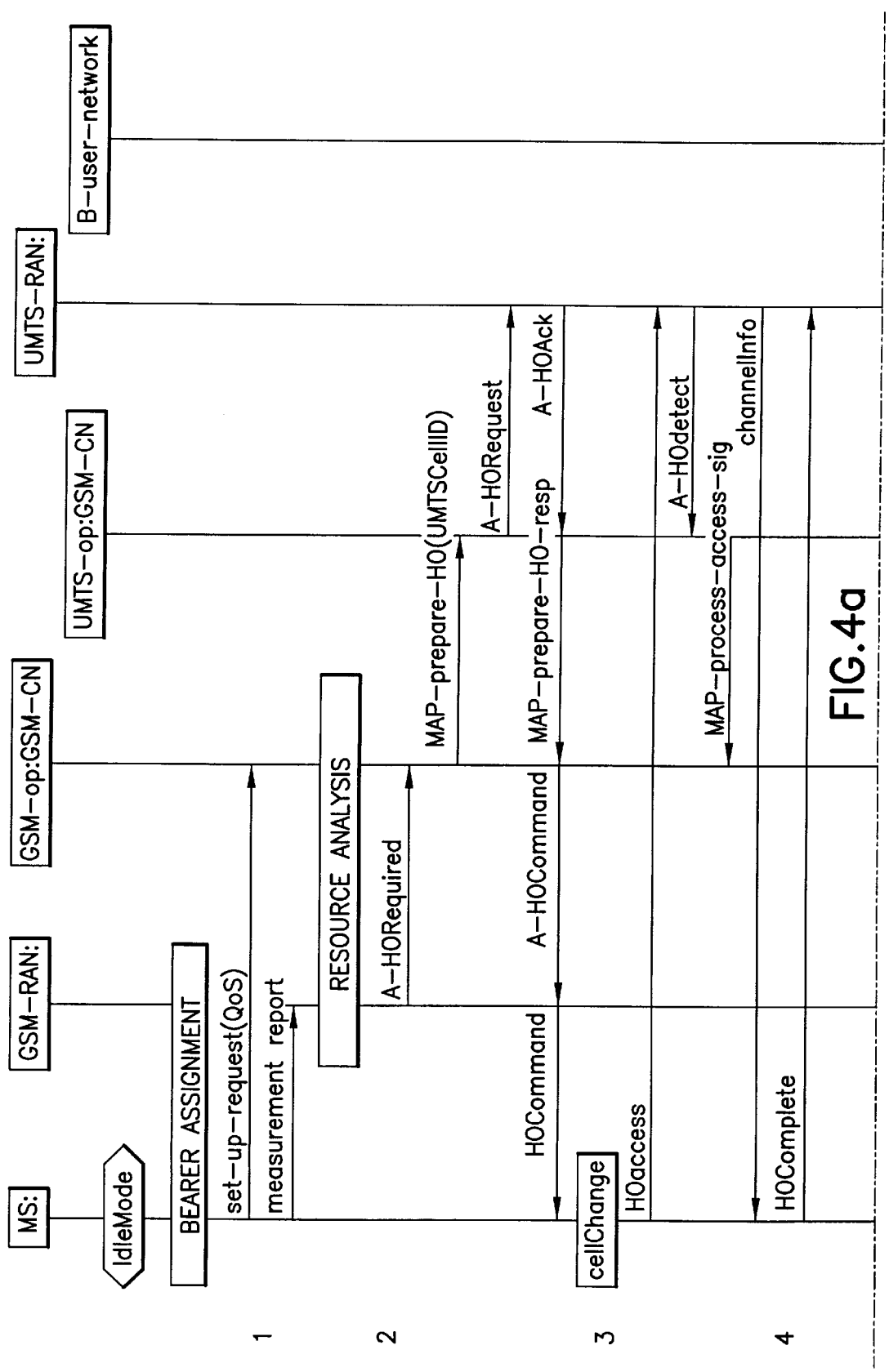

FIGS. 4A and 4B illustrate a possible implementation scenario for the roaming for service unction where data transmission between the MS 3 and the networks is by circuit switched transmission (i.e. where one or more traffic channels are reserved for the duration of the transmission). The following legends are used in FIGS. 4A and 4B:

| | |
|---|---|
| MS | Mobile Station |
| RAN | Radio Access Network |
| CN | Core Network |
| GSM-op | GSM operator, owner of the first network |
| UMTS-op | UMTS operator, owner of the second network |

The following table contains a description of the messages of FIGS. 4A and 4B:

| | |
|---|---|
| A-HORequired | indication from the radio access network that handover is needed |
| MAP-prepare-HO | handover request between networks |
| A-HORequest | handover request to the radio access network |
| A-HOAck | acceptance of handover request from the radio access network |
| MAP-prepare-HO-resp | response to handover request between networks |
| A-HOCommand | handover command to the radio access network |
| HOCommand | handover command to the MS |
| HOAccess | MS sends access attempt to the radio access network |
| A-HOdetect | the radio access network informs network that the MS's access attempt has been detected |
| MAP-process-access-sig | indication that handover process is ongoing |
| HOComplete | the radio access network informs the MS that handover process has been completed |
| A-HOComplete | the radio access network informs network that handover process has been completed |
| MAP-send-end-sig | the second network informs the first network that handover process has been completed |
| A-clr-command | the first network commands the radio access network to release reserved radio resources |

Signaling can be divided into eight main steps as follows:

1. The MS sends a service request with quality of service (QoS) parameters to the GSM network. These QoS parameters may include bit transmission rate, bit error rate, and transmission delay.
2. The GSM network analyses the available resources for the service. The GSM network detects that it cannot provide the requested quality of service thus it sends a handover request to the UMTS network.
3. The UMTS network accepts the handover request. The MS is commanded to the UMTS network with handover command and the MS makes an access attempt after the MS has changed to the UMTS network's cell.
4. Handover access has been detected by the UMTS network and the resources of the GSM network are released.
5. The MS continues the service request signaling with the UMTS network.
6. The UMTS network starts billing procedure in order to bill the GSM network for the service.
7. When the service is released the billing procedure is stopped.
8. The MS selects the GSM network if it is available.

Figure 5A:
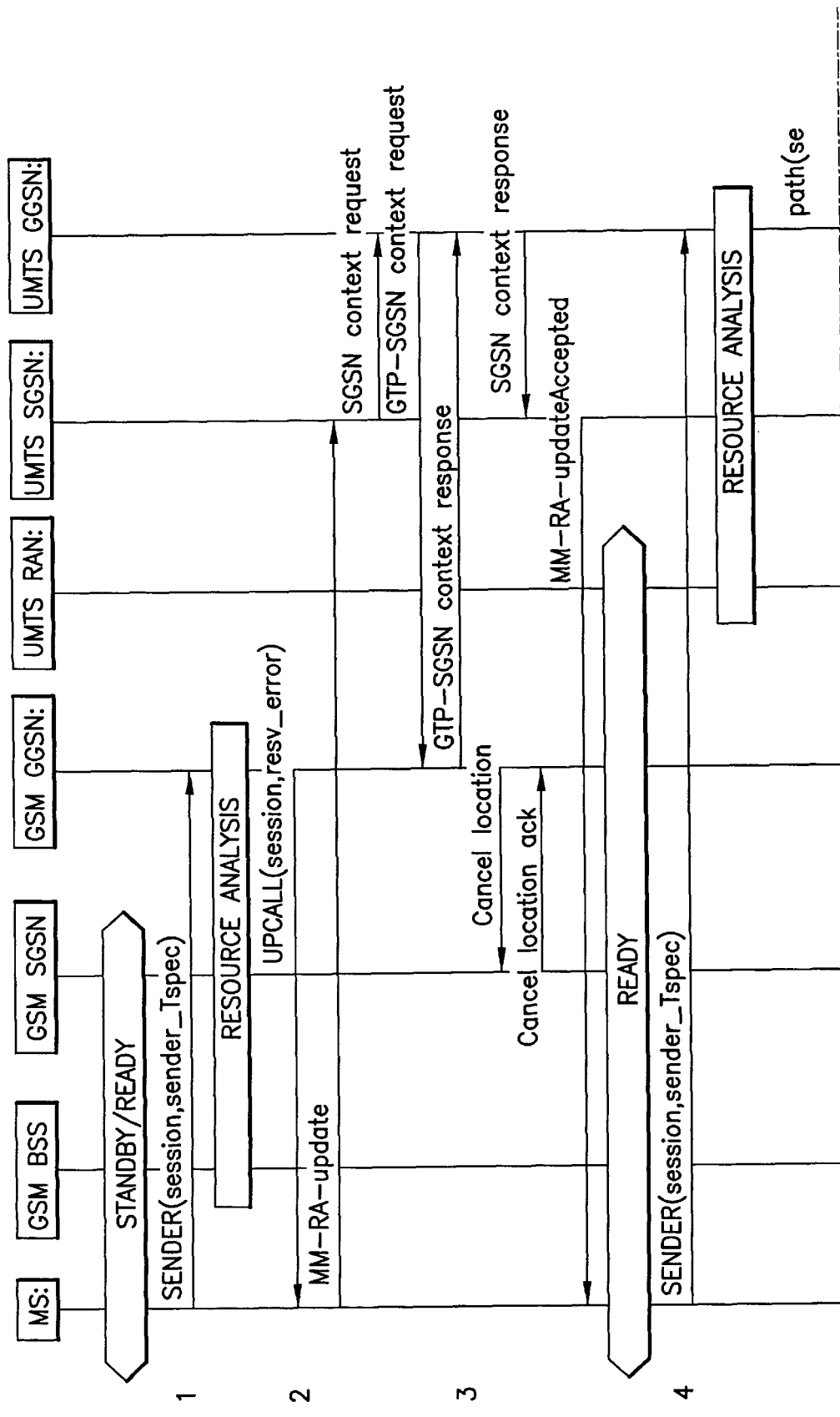

FIGS. 5A and 5B illustrate a possible implementation scenario for the roaming for service function where data transmission between the MS 3 and the networks is by packet switched transmission (i.e. where transmission time slots are dynamically allocated for transmission according to demand and priority). The following legends are used in FIGS. 5A and 5B:

| | | |
|---|---|---|
| MS | Mobile Station | |
| BSS | Base Station Subsystem | |
| SGSN | Service GPRS Support Node | |
| GPRS | General Packet Radio Service | |
| GGSN | Gateway GPRS Support Node | |
| RAN | Radio Access Network | |
| IP | Destination Internet Protocol Node | |

The following table contains a description of the messages of FIGS. 5A and 5B:

| | |
|---|---|
| SENDER(session, sender_Tspec) | application session in the MS requests quality of service described in sender_Tspec |
| UPCALL(session, resv_error) | error message with code "quality of service cannot be provided" |
| MM-RA-update | routing area update message |
| SGSN context request | context for the MS is requested |
| GTP-SGSN context request | context request between two GGSNs |
| GTP-SGSN context response | context request confirmation |
| Cancel location | location cancelled from the previous SGSN |
| Cancel location ack | location cancellation acknowledgment |
| SGSN context response | the MS context activation accepted by GGSN |
| MM-RA-updateAccepted | routing area updating confirmation |
| path(sender, sender_Tspec) | quality of service request to the destination IP node |
| rsvp(Tspec) | merged quality of service request to the previous IP node |
| UPCALL(session, resv_confirm) | connection and quality of service confirmation |
| RELEASE(session) | session release |
| resvTear(session) | resource release between IP nodes |

Again, signaling can be divided into eight main steps as follows:

1. Application in the MS sends a service request with quality of service parameter to the GSM network.
2. Available radio resources are analysed and a service request is rejected due to the lack of resources. The MS selects the UMTS network.
3. The GSM and the UMTS network exchange information about the MS and finally the UMTS network accepts the MS to access the network.
4. Application in the MS sends a service request with quality of service parameter to the UMTS network.
5. The UMTS network has radio resources available and it sends path-message to the destination IP node. Resources for the session are found and the MS is confirmed about the resource reservations.
6. Data transfer between application starts. Billing and roaming starts.
7. Application is closed or timer expires. The session is closed and resource reservations are released.
8. The MS selects the GSM network. The UMTS network bills the GSM network for the service.

In the implementations of FIGS. 4A and 4B and FIGS. 5A and 5B, it is the GSM network which determines, from the request made by the MS, whether or not it can provide the requested service and therefore whether or not the MS must be handed over to the UMTS network. In this way, the operation can be transparent to the user who is unaware that a handover has occurred in an alternative approach however, the MS may be configured such that it is able to determine when a requested service is not provided by the GSM network. The MS may then automatically, or following a prompt from the user, de-register with the GSM network and subsequently register with the UMTS network.

It will be appreciated by those of skill in the art that further modifications may be made to the above described embodiments without departing from the scope of the present invention. For example, the invention may be used to provide service roaming between any two or more networks which provide different numbers or levels of service, e.g. two GSM or two UMTS networks.

| | Glossary |
|---|---|
| BSS | Base Station Subsystem |
| DCS | Digital Cellular System (at 1800 MHz) |
| DECT | Digital European Cordless Telecommunications |
| HLR | Home Location Register |
| HPLMN | Home Public Land Mobile Network |
| IETF | Internet Engineering Task Force |
| IMSI | International Mobile Subscriber Identity |
| IP | Internet Protocol |
| GPRS | General Packet Radio Service |
| GSM | Global System for Mobile Communications |
| MS | Mobile Station |
| RSVP | Reservation Set-up Protocol |
| UMTS | Universal Mobile Telecommunications System |

What is claimed is:

1. A method of operating a mobile communication device within a geographical area having overlapping coverage from first and second mobile telephone networks, where said first network is the home network of the mobile communication device and said first and second networks provide respective first and second sets of services in said geographical area, the method comprising registering the device with said first network when a service of said first set is requested and registering the device with said second network when a service of said second set, but not of said first set, is requested.

2. A method according to claim 1, wherein the overall geographical coverage of said second network is less than that of said first network.

3. A method according to claim 1, wherein the request for a service is made by the mobile communication device in response to a user input.

4. A method according to claim 1, wherein the request for a service is made by the first network in response to an incoming call made to the mobile communication device.

5. A method according to claim 3, wherein, in the event that a service of said second set, but not of said first set, is requested, registration with said second network is carried out automatically under the control of said first network.

6. A method according to claim 1, wherein said first network is a GSM network and said second network is a UMTS network and said mobile communication device is a dual mode UMTS/GSM device.

7. The method according to claim 1 wherein the requested service of the second set is not a service of the set of services of said first set.

8. A method according to claim 1, wherein said choosing a desired service is independent of the availability of the service in the first network.

9. A method according to claim 1, wherein a service provided by said second network, but not by said first network, is a high transmission rate service.

10. A mobile telecommunication system comprising at least first and second mobile telephone networks having an overlapping geographical area of coverage and a multiplicity of mobile communication devices, whereni said first network is the home network of the mobile communication devices and said first and second networks are arranged to provide respective first and second sets of telephonic services in said geographical area, the system comprising: control means for registering a communication device with said first network when a service of said first set is requested and for registering the device with said second network when a service of said second set, but not of said first set, is requested, wherein the control means comprises means for determining if the desired service belongs to said first set, in response to a request for service received from said mobile communications device.

11. A system according to claim 10, wherein the control means comprises means associated with the first network for responding to a request from a communication device for a service of said second set, but not of said first set, by re-registering the communication device with the second network.

12. The system according to claim 10 wherein the requested service of the second set is not a service of the set of services of said first set.

13. A mobile telecommunication system comprising at least first and second mobile telephone networks having an overlapping geographical area of coverage and a multiplicity of mobile communication devices, wherein said first network is the home network of the mobile communication devices and said first and second networks are arranged to provide respective first and second sets of telephonic services in said geographical area, the system comprising control means for registering a communication device with said first network when a service of said first set is requested and for registering the device with said second network when a service of said second set, but not of said first set, is requested, wherein the control means comprises means associated with each of the mobile communication devices for transmitting a deregistration request to the first network and for transmitting a registration request to the second network when a service of said second set, but not of said first set, is requested.

14. A system according to claim 13, wherein the control means comprises, means associated with each of the mobile communication devices for transmitting a deregistration request to the first network and for transmitting a registration request to the second network when a service of said second set, but not of said first set, is requested.

* * * * *

UNITED STATES PATENT AND TRADEMARK OFFICE
CERTIFICATE OF CORRECTION

| | | |
|---|---|---|
| PATENT NO. | : 6,377,804 B1 | Page 1 of 1 |
| APPLICATION NO. | : 09/095906 | |
| DATED | : April 23, 2002 | |
| INVENTOR(S) | : Raino Lintulampi | |

It is certified that error appears in the above-identified patent and that said Letters Patent is hereby corrected as shown below:

In the Claims:

Column 6
Lines 38-42, Claim 1: rewrite to read as follows:

-- cal area, the method comprising the steps of:
    choosing a desired service to be requested;
    determining if the desired service belongs to said first set; and
    if the desired service belongs to said first set, then registering the device with said first network,
    if the desired service does not belong to said first set, then registering the device with said second network if the desired service belongs to said second set. --.

Column 7
Line 4, Claim 10: change "whereni" to -- wherein --.

Signed and Sealed this
Sixteenth Day of September, 2014

Michelle K. Lee
*Deputy Director of the United States Patent and Trademark Office*